March 27, 1956
P. G. HEROLD ET AL
2,739,901
RUTHENIUM CONTAINING GLASSES AND STAINS
Filed July 14, 1952
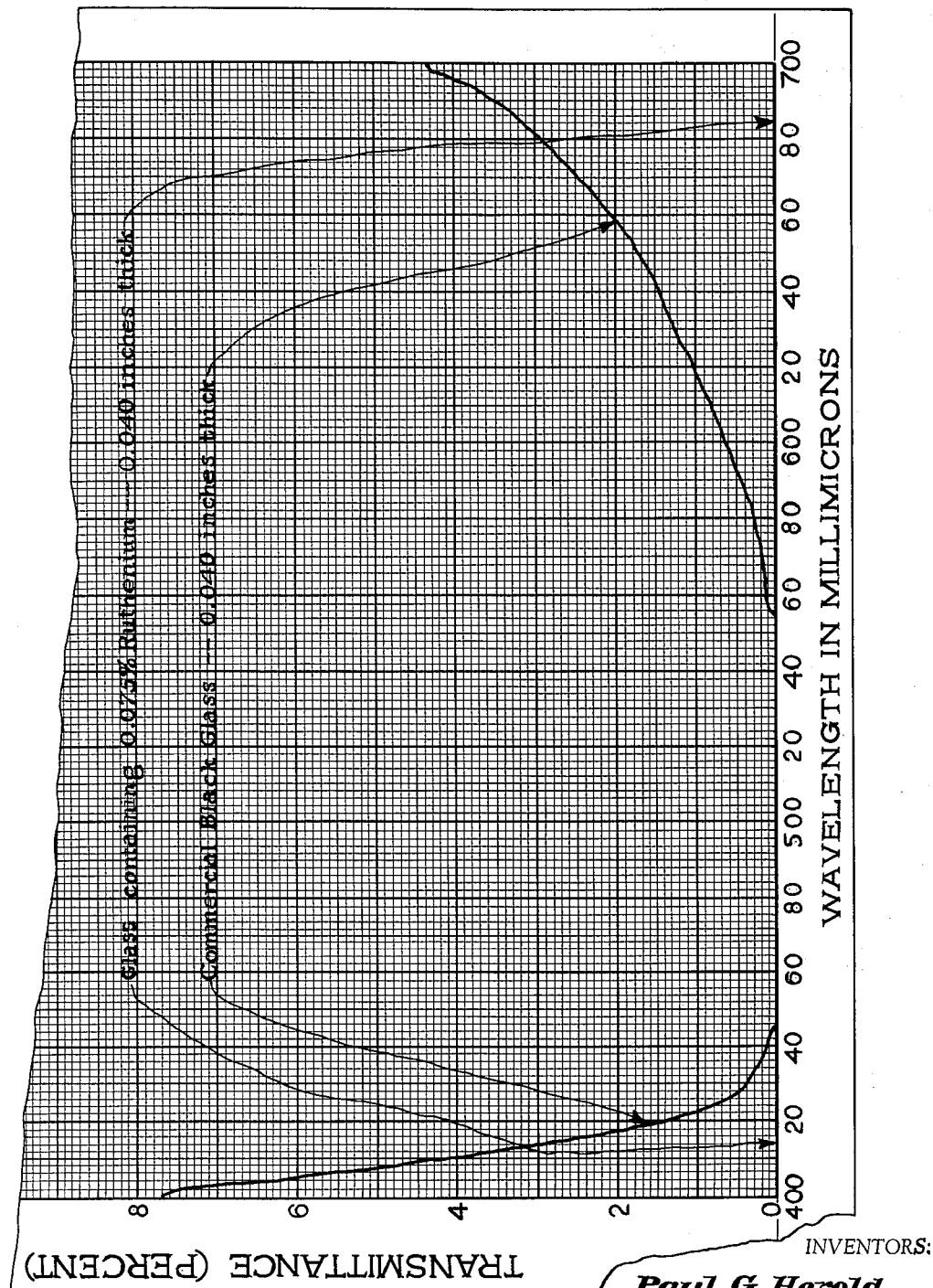
INVENTORS:
Paul G. Herold,
Theodore J. M. Planje,
 & John C. Williams,
BY Cushman, Darby & Cushman
ATTORNEYS.

United States Patent Office 2,739,901
Patented Mar. 27, 1956

2,739,901

RUTHENIUM CONTAINING GLASSES AND STAINS

Paul G. Herold and Theodore J. M. Planje, Rolla, Mo., and John C. Williams, Morristown, N. J.

Application July 14, 1952, Serial No. 298,808

6 Claims. (Cl. 106—47)

This invention relates to the production of red coloration and black coloration in glasses and brown coloration in stains, and more particularly, to compositions containing ruthenium.

It is an object of this invention to make lead borosilicate and lead silicate glasses, glazes and enamels take on a pink to reddish-black coloration by reflected or transmitted light, and to make all other types of glasses, glazes and enamels taken on a true black coloration by reflected or transmitted light by adding ruthenium metal or ruthenium oxide or any other compound of ruthenium which will be converted to ruthenium oxide when in intimate contact with the molten ingredients of the glass, to the batch composition of the particular glass, glaze or enamel, and fusing the batch to cause the ruthenium material to go into solution in the melt.

A further object of this invention is to produce ceramic stains by mixing ruthenium containing materials with other compounds and firing to cause a coloration in the mass of stain.

The term "lead borosilicate glass" denotes a glass composition produced by fusing a bath containing appreciable amounts of lead oxide and boron oxide together with silica.

The term "lead silicate glass" denotes a glass composition produced by fusing a batch containing a predominant amount of lead oxide together with silica, which does not contain boron oxide. By a predominant amount is meant that the lead oxide constituent of the batch is present in amounts substantially in excess of any other ingredient in the batch.

The accompanying drawing shows a graphical representation of the wave lengths of light reflected or transmitted by a commercial black glass in comparison with a black glass produced by the invention.

As examples of glasses, glazes, enamels and stains to which the invention may be employed, the following compositions are given, the percentages of various compounds making up a composition being expressed in percentages by weight.

using appropriate amounts of ruthenium metal, or by using appropriate amounts of any other ruthenium compound which has been comminuted and mixed through the composition. The glass, glaze, or enamel is then handled in an appropriate way to manufacture the desired red or black colored glass, glaze or enamel, all of which handling is a well known art in the trade. The intensity of coloration is controlled by the amount of ruthenium material added to the glass, glaze or enamel composition, and ranges from a very light pink to a deep reddish-black in compositions I, II, IV and VI, shown in the table above, and ranges from a light gray to a true black in compositions III, V, and VII in the table. Composition VIII above is an example of a ceramic stain which produces a brown coloration. The ruthenium which we prefer to use is the ruthenium oxide, although any other compound which may be decomposed or changed to the oxide may be used.

The pink to reddish-black coloration achieved in the lead borosilicate or lead silicate glasses, glazes and enamels is produced by adding from 0.001% to 20.0% of ruthenium, ruthenium oxide or ruthenium oxide yielding material, and fusing the batch so produced.

The black color produced in the glasses, glazes and enamels other than those of the lead borosilicate or lead silicate type is what is known as a true black color, and is characterized by an equivalent absorption of all wave lengths of reflected or transmitted light. This is clearly illustrated by the drawing in which, it will be noted, that the glass containing 0.075% ruthenium absorbs all wave lengths of reflected or transmitted light so that the curve for this glass never rises above the zero (0) point on the ordinate. Also shown in the drawing is a curve for a commercial black glass of essentially the same composition, in which the color is produced in the normal way; that is, by dissolving several oxides to give overlapping absorptions at various wave lengths. Such commercial glass under certain conditions of use gives a reddish, bluish or greenish hue, depending on which coloring oxide is predominant. The use of the invention, ruthenium in solution in a glass, glaze or enamel, gives a black coloration which imparts no predominant hue.

The brown colored ceramic stain is produced by fusing 0.005% to 20.0% ruthenium, ruthenium oxide or ruthenium oxide yielding material together with a material consisting essentially of any one or a combination of compounds of elements such as silicon, titanium, germanium, zirconium, tin, cerium, hafnium and thorium. A typical example is given as composition VIII in the table above.

Having thus described our invention, what is claimed is:

1. A glass composition containing from 0.001% to 20.0% of a material selected from the group consisting of ruthenium and ruthenium oxide.

|  | (red) I | (red) II | (black) III | (red) IV | (black) V | (red) VI | (black) VII | (brown) VIII |
|---|---|---|---|---|---|---|---|---|
| $SiO_2$ | 22.45 | 17.5 | 70.8 | 28.7 | 59.0 | 31.0 | 42.62 | |
| $Al_2O_3$ | | | | | 2.8 | | 1.06 | |
| $B_2O_3$ | | 17.5 | 7.0 | | 10.9 | | | |
| PbO | 73.91 | 65.0 | | 65.0 | | 40.8 | 14.70 | |
| $Na_2O$ | | | 5.4 | | 9.7 | 10.1 | 11.00 | |
| $K_2O$ | 3.74 | | 14.8 | 4.0 | 8.9 | 10.1 | 2.56 | |
| CaO | | | 2.0 | | 8.7 | | 1.20 | |
| MgO | | | | | | | 2.29 | |
| BaO | | | | 2.3 | | | | |
| ZnO | | | | | | | 1.10 | |
| $SnO_2$ | | | | | | 8.0 | | |
| $Sb_2O_3$ | | | | | | | 0.20 | |
| $F_2$ | | | | | | | 3.94 | |
| $TiO_2$ | | | | | | | | 99.9 |
| $RuO_2$ | 0.003 | 0.003 | 0.075 | 0.003 | 0.075 | 0.003 | 0.075 | 0.1 |

Proper coloration may be produced in any of the typical glasses, glazes and enamels given in the above table by using appropriate amounts of a salt of ruthenium or by 2. A pink to reddish-black colored glass, glaze and enamel which consists essentially of a glass composition selected from the group consisting of lead borosilicate glasses and lead silicate glasses, and from 0.001% to 20.0% of a material selected from the group consisting of ruthenium and ruthenium oxide.

3. A brown-colored ceramic stain consisting essentially of at least one oxide selected from the group consisting of titanium and zirconium oxides, and from 0.005% to 20.0% of a material selected from the group consisting of ruthenium and ruthenium oxide.

4. A stain as recited in claim 3 in which the oxide is titanium oxide.

5. A method of producing a pink to reddish-black coloration in glasses, glazes and enamels which comprises, adding to the batch composition of a glass selected from the group consisting of lead borosilicate glasses and lead silicate glasses from 0.001% to 20.0% of a material selected from the group consisting of (1) ruthenium, (2) ruthenium oxide, and (3) compounds of ruthenium which will be converted to ruthenium oxide when in intimate contact with the molten ingredients of the glass to be colored, and then subjecting the batch composition to sufficient heat to cause fusion.

6. A method of producing a brown-colored ceramic stain which comprises, fusing together at least one oxide selected from the group consisting of titanium and zirconium oxides and from 0.005% to 20.0% of a material selected from the group consisting of (1) ruthenium, (2) ruthenium oxide, and (3) a compound of ruthenium which will be converted to ruthenium oxide by said fusion.

No references cited.